United States Patent
Reid et al.

(10) Patent No.: US 11,002,516 B1
(45) Date of Patent: May 11, 2021

(54) BLINDER FOR SIGHT-AIMED DEVICES

(71) Applicants: Elizabeth Heiden Reid, Palo Alto, CA (US); Joanne Elizabeth Reid, Grand Junction, CO (US); Carl Douglas Reid, Durham, NC (US); Russell Mackay Reid, Palo Alto, CA (US)

(72) Inventors: Elizabeth Heiden Reid, Palo Alto, CA (US); Joanne Elizabeth Reid, Grand Junction, CO (US); Carl Douglas Reid, Durham, NC (US); Russell Mackay Reid, Palo Alto, CA (US)

( * ) Notice: Subject to any disclaimer, the term of this patent is extended or adjusted under 35 U.S.C. 154(b) by 0 days.

(21) Appl. No.: 16/695,606

(22) Filed: Nov. 26, 2019

(51) Int. Cl.
| F41G 11/00 | (2006.01) |
| B29C 70/34 | (2006.01) |
| B29K 277/00 | (2006.01) |
| B29K 63/00 | (2006.01) |
| F41G 1/42 | (2006.01) |

(52) U.S. Cl.
CPC ............. *F41G 11/00* (2013.01); *B29C 70/34* (2013.01); *B29K 2063/00* (2013.01); *B29K 2277/10* (2013.01); *F41G 1/42* (2013.01)

(58) Field of Classification Search
CPC ................................. F41G 3/005; F41G 11/00
USPC ............................................................ 42/111
See application file for complete search history.

(56) References Cited

U.S. PATENT DOCUMENTS

| 309,342 | A | * | 12/1884 | Gilbert | F41G 1/473 42/111 |
| 621,066 | A | * | 3/1899 | Gilbert-Russell | F41G 1/18 42/138 |
| 1,320,888 | A | * | 11/1919 | Miller | F41H 5/12 89/36.06 |
| 2,306,708 | A | * | 12/1942 | Mendel | F41C 27/04 42/106 |
| 5,377,577 | A | * | 1/1995 | Bounkong | F41H 5/08 2/2.5 |
| 2014/0007484 | A1 | * | 1/2014 | Erdoss | F41G 3/005 42/111 |
| 2014/0013495 | A1 | * | 1/2014 | Aquino | F41H 5/0485 2/463 |
| 2016/0031164 | A1 | * | 2/2016 | Downs | B29C 66/4332 428/12 |
| 2018/0044852 | A1 | * | 2/2018 | Downs | D06P 5/2033 |

* cited by examiner

*Primary Examiner* — Bret Hayes

(57) ABSTRACT

A blinder for sight-aimed devices comprising one or more thin leaves of fiber-reinforced polymer, optionally within a fabric envelope.

8 Claims, 6 Drawing Sheets

BLINDER FOR SIGHT-AIMED DEVICES

FIELD OF THE INVENTION

The present invention relates to an aiming blinder to be used as an aid for sight-aimed devices such as target rifles, and a method of manufacturing the same.

BACKGROUND OF THE INVENTION

Unwanted visual input disrupts aiming of any sight-aimed targeted device. In a preferred embodiment of the current invention, the sight-aimed device may be a target rifle, especially a biathlon target rifle. Therefore the person aiming the targeted device may herein be referred to as a shooter. Shooters who are highly skilled, especially competitive shooters, often employ some kind of visual aid to block or reduce unwanted visual input. Such an aiming aid is commonly called a blinder, an eye blinder, or an aiming blinder. All three aforementioned terms will be used interchangeably herein to refer to a device that blocks unnecessary or unwanted visual input for someone aiming a sight-aimed device.

Aiming blinders are especially helpful in competitions where optical magnifying sights are disallowed, and outdoors where bright sky and sun can make sighting difficult.

Aiming blinders present problems because they need to be vertically and horizontally large compared to the dimensions of a firearm and its sight, while also being in the correct locations relative to the shooter's eyes. Aiming blinders are frequently used to diminish or block out the image formed by the non-sighting eye, which is not aligned with the sighting axis but forms a competing and parallax-shifted image in the brain.

Blinders are also often used to block out or diminish direct sunlight, regions of bright sky or clouds, bright snow, distractions, and sometimes wind, rain and snow. Heads are usually much wider than firearms, which otherwise are held close to the body, so blinders are frequently the widest part of a firearm. Additionally, human field of view is broad, and targets often subtend a small portion of that field of view, so blinders often must have substantial vertical size to block unhelpful or bright light from above or below.

Seeing requires assembling a visual image in the brain and interpreting it, and although people do it without conscious effort, seeing is a skill. Highly skilled shooters have preferences and abilities and operate in a wide range of conditions. Although some shooters learn a skill that enables them to suppress the image formed by the non-sighting eye, most shooters need some form of blinder for the non-sighting eye. But because of such variations, as well as variations in conditions, different shapes of blinders are used for different shooters under differing conditions. An aiming blinder that blocks some input to both eyes while allowing the sighting eye to see through a hole or slot is referred to herein as a two sided blinder or full blinder. A blinder that substantially reduces visual input to the left eye, while allowing most input to the right eye, is referred to herein as a left blinder or left eye blinder. A blinder that substantially reduces visual input to the right eye, while allowing most input to the left eye, is referred to herein as a right blinder or right eye blinder. The illustrations and figures make the variations clear, but all such shapes which block or diminish some visual input are to be considered blinders.

A lateral protrusion of such size is a major problem for carrying and storage, especially in cases such as the sport of biathlon. Biathletes carry their rifles on their backs for many kilometers, all the while crushing blinders between a heavy rifle and an athlete's back. Therefore necessary characteristics for a biathlon blinder are robustness and extreme flexibility so that the blinder neither disintegrates nor injures the athlete's back. For the same reasons, the need to be fairly large but robust and flexible, biathlon blinders are usually heavy, commonly being made of thick neoprene rubber. Since biathlon is a timed event and all equipment must be carried up and down substantial hills and then held steady while shooting, heavy blinders are undesirable. Additionally, resumption of design shape when shooting is important, especially in a timed event.

Prior art for biathlon blinders consists of membranes formed of elastomer, usually neoprene rubber, thereby providing adequate robustness and flexibility. Important drawbacks to conventional blinders stem from the characteristics of elastomers: their flexibility comes at the expense of strength and stiffness. Therefore blinders made from elastomer are heavy, and don't retain their shape without adding a substantial amount of material, which makes them even heavier. Some prior art uses malleable metal strips fastened to an elastomer membrane as a means to address shape retention, but the malleable nature of the strips causes them to be deformed while the rifle is being carried, therefore requiring time spent on manual readjustment at each shooting station. Metal strips that are elastic instead of malleable have proved unsuitable, being either too stiff while being carried or else failing under extreme bending.

For the reasons outlined above, current biathlon blinders are heavy, clumsy, and don't retain their shape well.

The current invention addresses the aforementioned problems by use of a radical change in materials. Across almost all materials, stiffness and strength are positively correlated, while elongation is inversely correlated. Rubber has low strength but high elongation and nearly zero stiffness, or elastic modulus, and is therefore highly flexible. But beam theory posits a different approach to achieving high flexibility while maintaining tear strength: use very high strength, rather than low strength materials, but in extremely thin sections. Tearing strength grows or decays linearly with section thickness, while stiffness rises or decays as the cube of section thickness. Therefore a material 10 times stronger and 10 times stiffer but one fifth the thickness will form a sheet with twice the tearing strength but more flexible by a factor of 125/10. This is the approach developed in the current invention.

OBJECTS OF THE INVENTION

It is an object of this invention to provide an aiming blinder that is lightweight, flexible enough to be directly mounted without need for removal or flip-up mechanisms, comfortable when folded or crushed against a body, robust enough to avoid cracking, tearing, or bending, and having and retaining a design shape, both curve and outline shape, that is suited to the user.

SUMMARY OF THE INVENTION

An object of the present invention is to provide a lightweight, shape-retaining blinder that is flexible and tough enough to be direct mounted along the sighting axis of an aimed device where it can withstand being repeatedly folded flat, but still springing back to design shape when deployed. In the preferred embodiment, an additional object of the present invention is to be flexible enough to be comfortable against an athlete's back.

In order to accomplish the aforementioned objects, an aspect of the current invention comprises a stack of one or more independent thin leaves of fiber-reinforced polymer. In order to accomplish sufficient flexibility, a preferred embodiment of the current invention may use leaves cut from a sheet that has been vacuum molded over a shaped mandrel to compress minimum-thickness epoxy resin around a flat-woven para-aramid fabric laid on a 45 degree bias to the folding axis. In order to accomplish the aforementioned objects, a preferred embodiment may use one or more independent thin para-aramid leaves, optionally contained within a fabric envelope.

The current invention comprises the steps of manufacture, the apparatus embodying features of construction, and the item of manufacture exemplified in the detailed disclosure.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
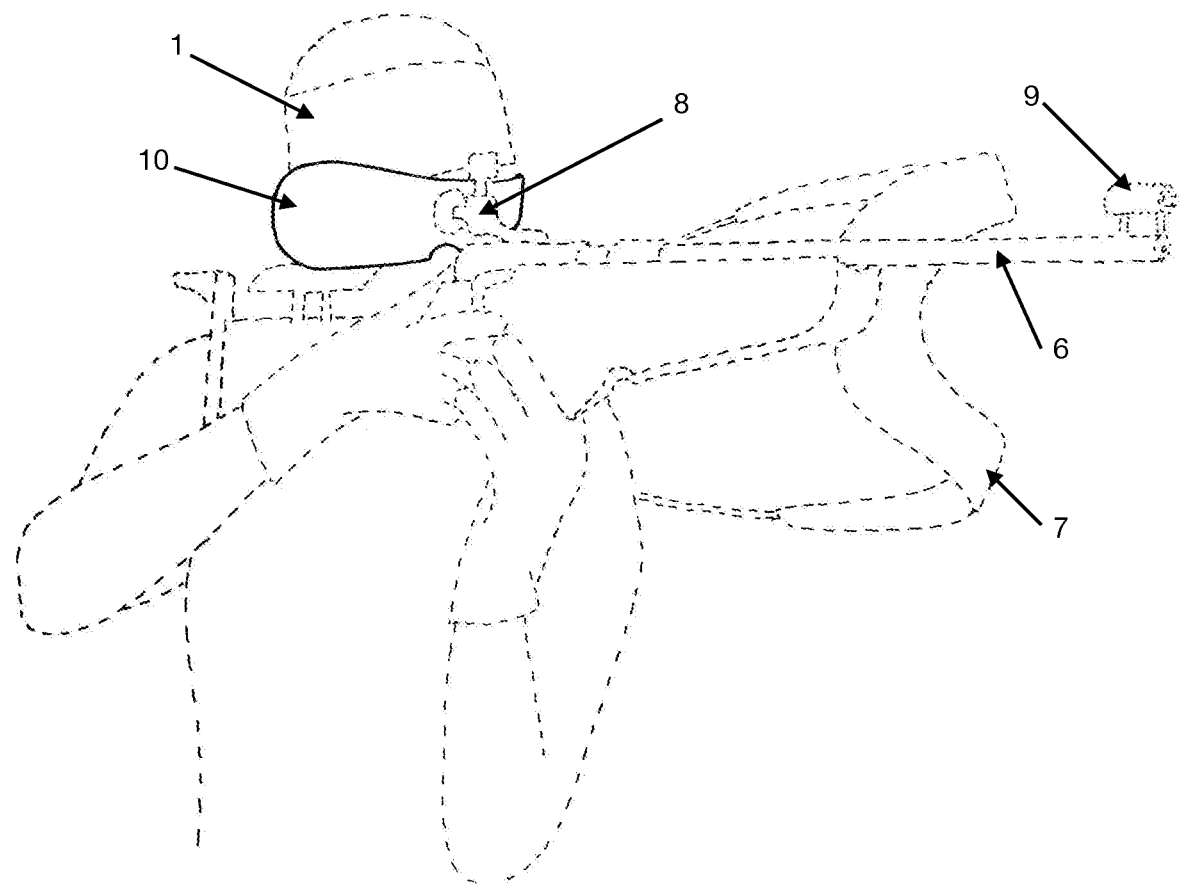
FIG. 1 Use of a biathlon aiming blinder.
Figure 2:
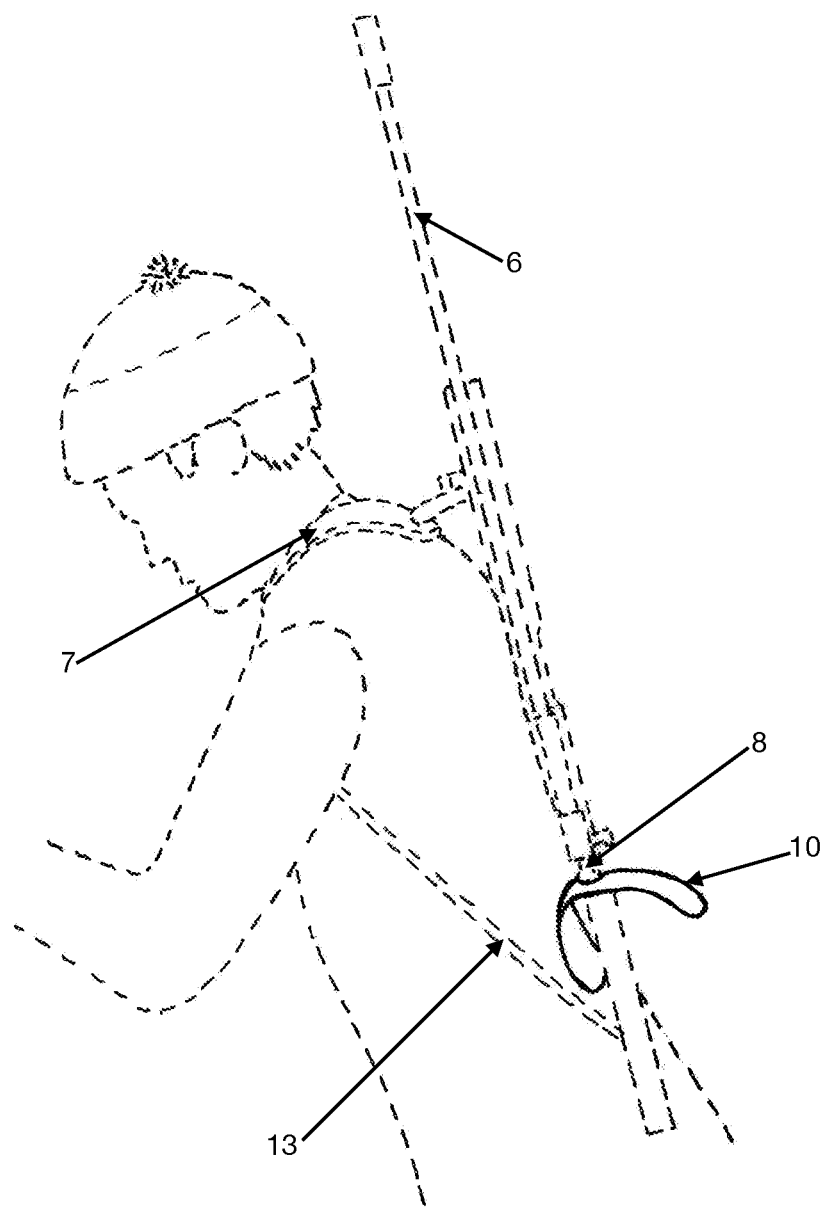
FIG. 2 Carrying a biathlon rifle with aiming blinder.

Illustration FIG. 1 shows an exemplary use of a preferred embodiment of an aiming blinder on a biathlon rifle. Illustration FIG. 1 shows use of said blinder while athlete is sighting a target. In FIG. 1, the shooter [1] sights along the firearm barrel [6] by aligning a careful view of the target, by sighting through the body of blinder [10] while aligning the target with front sight [9] and rear sight [8].

Illustration FIG. shows an exemplary use of a preferred embodiment of an aiming blinder on a biathlon rifle, displaying said use while an athlete is carrying the firearm with the aiming blinder fixed directly to the rear sight [8] of the firearm, in such position that it will resume design shape as soon as the rifle is removed from carrying position. In FIG., the athlete skis while carrying the rifle over varied terrain including steep hills. The firearm barrel [6] is aligned upward, supported by the carrying harness [7], while the harness elastic [13] together with the weight of the rifle, compresses the body of blinder [10] against the athlete's back, crushing and deforming the body of blinder [10] which simultaneously pushes into the back of the athlete.

Figure 3:
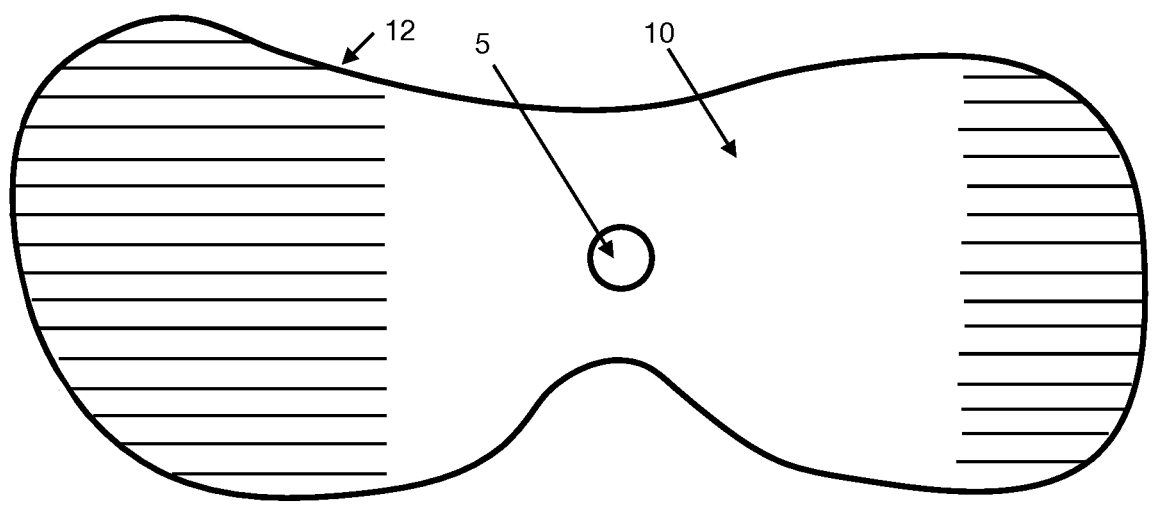
FIG. 3 Front view of one leaf of two sided aiming blinder in preferred embodiment.

FIG. 3 shows an exemplary embodiment of a two-sided blinder, which may diminish unwanted visual input into both eyes. In this view the body of blinder [10] may comprise one or more structural leaves optionally contained within a fabric envelope. The outer perimeter shape of blinder [12] illustrates the external shape which determines what regions are blocked from the view of the shooter. A sighting or mounting hole [5] allows sighting and direct mounting of the blinder onto the firearm sight.

Figure 4:
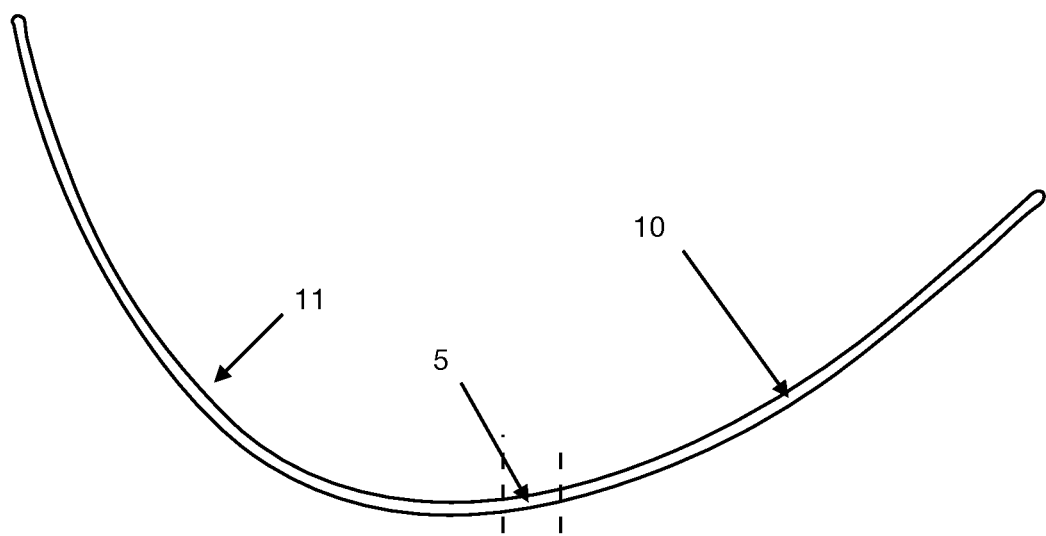
FIG. 4 Top view of one leaf of two sided aiming blinder in preferred embodiment.

FIG. 4 shows a top view of the two-sided blinder of the preceding embodiment, wherein the body of blinder [10] may comprise one or more structural leaves optionally contained within a fabric envelope. The exemplary embodiment includes a sighting or mounting hole [5] which allows direct mounting onto a device sight. The blinder of this embodiment maintains a design shape curve [11], imparted by a shaping mandrel in the manufacturing process. Said design shape curve [11] impacts both convenience in assuming shooting position and how much of the shooter's field of view is suppressed.

Figure 5:
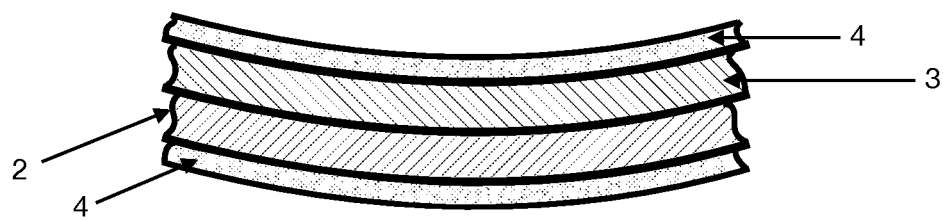
FIG. 5 Cross section of aiming blinder in a preferred embodiment.

FIG. 5 shows one possible layer structure of a preferred embodiment of a two-sided blinder. One para-aramid composite leaf [2] moves freely with respect to another para-aramid composite leaf [3], thereby doubling strength without diminishing allowable range of flexion. Both leaves are contained within a fabric envelope [4] which ensures that they flex in unison but without cross-bonding which would quadruple stiffness.

Materials and construction of the preferred embodiment of the current invention can be made sufficiently strong and flexible to allow them to be cut to differing two dimensional vertical and horizontal extents while still following the curve of a shooter's head, the design shape curve [11] in FIG. 4, thereby allowing some visual input while rejecting other input. Depending on direction of sunlight, preference of shooter, and location of distractions, a shooter may elect different configurations, choosing the two dimensional outer perimeter shape of blinder [12] visible in FIG. 3

Figure 6:
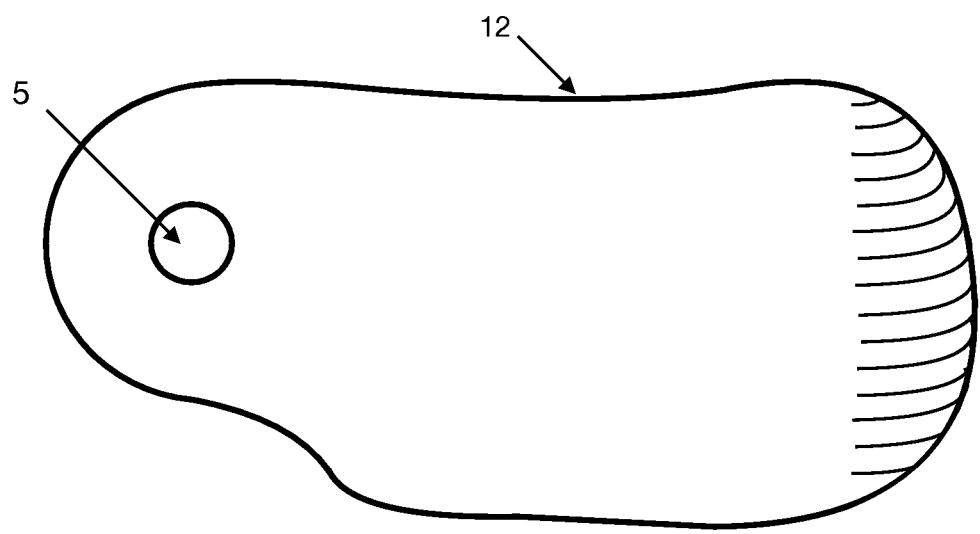
FIG. 6 Front view of one leaf of one sided aiming blinder in preferred embodiment.
Figure 7:
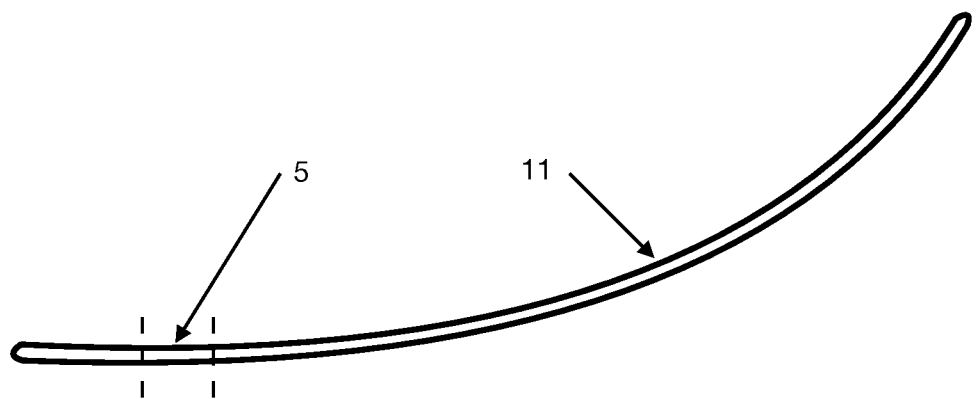
FIG. 7 Top view of one leaf of one sided aiming blinder in preferred embodiment.

FIG. 6 shows an exemplary embodiment of a left-sided blinder, which may diminish unwanted visual input to the left eye only, while allowing the right (sighting) eye to simultaneously see wind flags or other relevant visual input. FIG. 7 shows a top view of the same embodiment.

Figure 8:
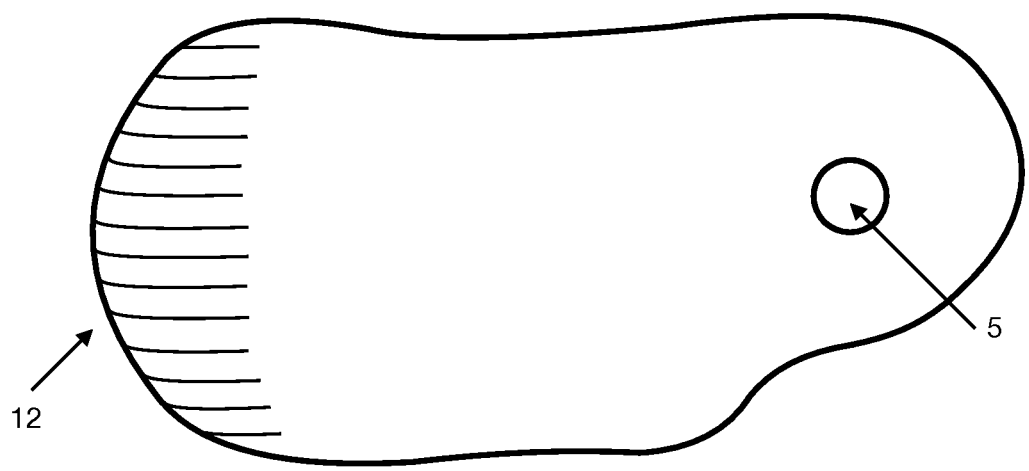
FIG. 8 Front view of one leaf of one sided aiming blinder in preferred embodiment.
Figure 9:
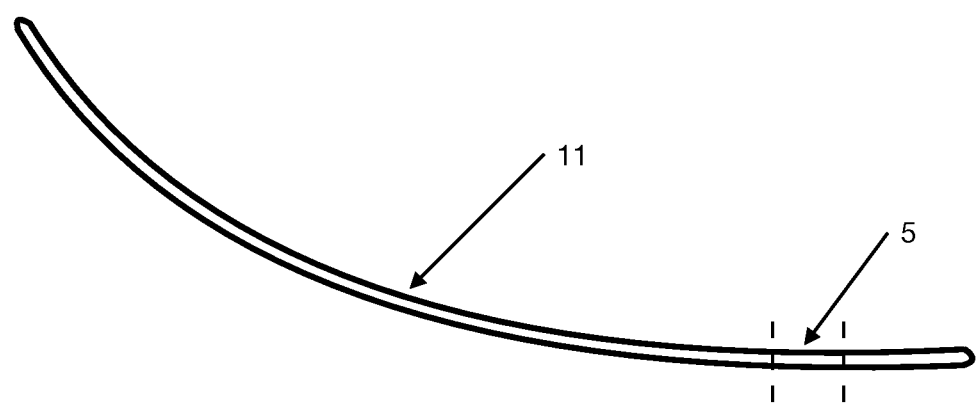
FIG. 9 Top view of one leaf of one sided aiming blinder in preferred embodiment.

FIG. 8 shows an exemplary embodiment of a right-sided blinder, which may diminish unwanted visual input to the right eye only. FIG. 9 shows a top view of the same embodiment.

Figure 10:
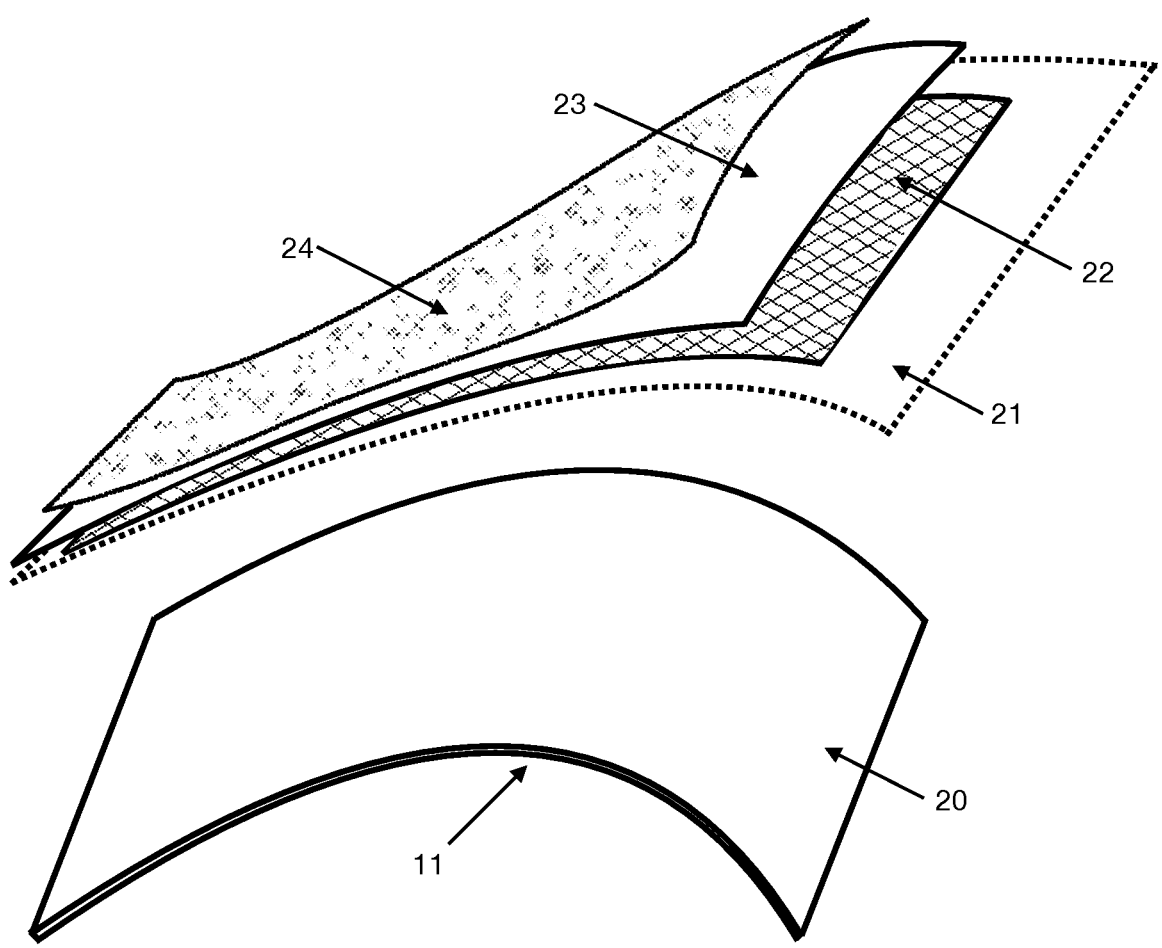
FIG. 10 Layers in manufacture of fiber reinforced polymer sheet for aiming blinder.

FIG. 10 shows an exemplary embodiment of the method of manufacture of thin fiber reinforced polymer sheets. A preferred embodiment of the aiming blinder of current invention comprises one or more such sheets cut into leaves and optionally contained within a fabric envelope. The sheets are molded into a desired design shape using a mold shaping mandrel [20] optionally aluminum shaped to the desired design shape curve [11]. The mandrel may be covered with a non-adhesive sheet layer [21] made of material such as polyethylene that prevents adherence of the polymer resin used as the composite matrix, such as epoxy. A woven fiber layer [22], optionally flat-woven para-aramid fabric cut on a bias orientation, is laid atop the prior layer and then impregnated the with polymer resin. A permeable non-adhesive layer [23] is laid atop the impregnated fabric, followed by an absorbent breathable layer [24], intended to absorb excess resin and allow air movement during evacuation. The layer stack is then cured under atmospheric pressure inside a flexible vacuum envelope.

It is intended that the matters described in the above descriptions and shown in the accompanying drawings be interpreted as illustrative.

The following claims are intended to cover all of the generic and specific features of the invention herein described.

What is claimed:

1. An aiming blinder comprising:
at least one sheet comprising fiber reinforced polymer, wherein the fiber reinforced polymer comprises a woven fabric in a polymer resin matrix;
wherein the at least one sheet is non-elastomeric;
wherein the at least one sheet further comprises a sighting or mounting hole;
wherein the at least one sheet includes a curved design shape provided in part by a mold shaping mandrel;
wherein the at least one sheet is configured to withstand being repeatedly folded and to spring back to the curved design shape upon deployment; and,
wherein the aiming blinder is configured to block or reduce unnecessary or unwanted visual input when aiming a sight-aimed device.

2. The aiming blinder of claim 1, further comprising containing the at least one sheet in a fabric envelope.

3. The aiming blinder of claim 2, wherein the at least one sheet is a plurality of sheets contained in the fabric envelope such that each of the sheets of the plurality of sheets functions independently of each other.

4. The aiming blinder of claim 1, wherein being repeatedly folded flat occurs along a folding axis oriented at 45 degrees to an angle of weave of the woven fabric.

5. The aiming blinder of claim 1, wherein the woven fabric is para-aramid and the polymer resin matrix includes epoxy.

6. The aiming blinder of claim 1, wherein the sighting or mounting hole is a mounting hole compatible with a competition biathlon rifle.

7. The aiming blinder of claim 1, wherein the blinder is a left blinder or a right blinder.

8. The aiming blinder of claim 1, wherein the blinder is a two sided blinder.

* * * * *